United States Patent
Yokoyama

(10) Patent No.: US 11,740,477 B2
(45) Date of Patent: Aug. 29, 2023

(54) ELECTRONIC DEVICE, METHOD FOR CONTROLLING ELECTRONIC DEVICE, AND NON-TRANSITORY COMPUTER READABLE STORAGE MEDIUM

(71) Applicant: CANON KABUSHIKI KAISHA, Tokyo (JP)

(72) Inventor: Shunichi Yokoyama, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 140 days.

(21) Appl. No.: 17/470,046

(22) Filed: Sep. 9, 2021

(65) Prior Publication Data
US 2021/0405383 A1 Dec. 30, 2021

Related U.S. Application Data

(63) Continuation of application No. PCT/JP2020/009091, filed on Mar. 4, 2020.

(30) Foreign Application Priority Data

Mar. 19, 2019 (JP) ................... 2019-051262

(51) Int. Cl.
*G02B 27/01* (2006.01)
*G06V 40/10* (2022.01)
(Continued)

(52) U.S. Cl.
CPC ....... *G02B 27/0179* (2013.01); *G06F 1/1694* (2013.01); *G06F 3/011* (2013.01); *G06V 40/103* (2022.01); *G02B 2027/0187* (2013.01)

(58) Field of Classification Search
CPC ........ G02B 27/0179; G02B 2027/0187; G02B 27/017; G06F 1/1694; G06F 3/011;
(Continued)

(56) References Cited

U.S. PATENT DOCUMENTS

2006/0106494 A1* 5/2006 Alvarez ............... H04N 5/222
  348/E5.022
2007/0265088 A1* 11/2007 Nakada ................ A63F 13/24
  463/37
(Continued)

FOREIGN PATENT DOCUMENTS

JP 2017111539 A 6/2017
JP 2018037034 A 3/2018
(Continued)

OTHER PUBLICATIONS

International Search Report issued in Intl. Appln. No. PCT/JP2020/009091 dated May 26, 2020. English translation provided.
(Continued)

*Primary Examiner* — Dmitriy Bolotin
(74) *Attorney, Agent, or Firm* — ROSSI, KIMMS & McDOWELL LLP

(57) ABSTRACT

An electronic device according to the present invention includes: a processor; and a memory storing a program which, when executed by the processor, causes the electronic device to: detect an inclination of a display surface; receive a user operation; and perform control to display, as a display range, a portion of an image on the display surface, change a position of the display range in response to a change in the inclination of the display surface, and change the position of the display range in response to a user operation, wherein a second movement amount in which the display range moves in response to the change in the inclination of the display surface is corrected based on a first movement amount in which the display range is moved by the user operation.

15 Claims, 10 Drawing Sheets

(51) Int. Cl.
　　　*G06F 1/16*　　　(2006.01)
　　　*G06F 3/01*　　　(2006.01)

(58) Field of Classification Search
　　　CPC ...... G06F 3/04815; G06F 3/147; G06F 3/012;
　　　　　　G06F 3/0346; G06F 3/0485; G06F
　　　　　　3/04886; G06F 3/1454; G06V 40/103;
　　　　　　G06V 20/20; G09G 2340/045; G09G
　　　　　　2340/0464; G09G 2354/00; G09G 5/00;
　　　　　　G09G 5/34; G09G 5/36
　　　See application file for complete search history.

(56) References Cited

U.S. PATENT DOCUMENTS

| | | | | |
|---|---|---|---|---|
| 2009/0070093 | A1* | 3/2009 | Nakanishi | A63F 13/211 |
| | | | | 703/22 |
| 2010/0279770 | A1* | 11/2010 | Ikeda | A63F 13/45 |
| | | | | 463/32 |
| 2012/0007882 | A1* | 1/2012 | Sakurai | G06F 3/04883 |
| | | | | 345/619 |
| 2012/0314899 | A1* | 12/2012 | Cohen | G06F 3/04815 |
| | | | | 382/103 |
| 2015/0352438 | A1* | 12/2015 | Suzuki | A63F 13/5255 |
| | | | | 345/156 |
| 2017/0171539 | A1 | 6/2017 | Inomata | |
| 2018/0196266 | A1 | 7/2018 | Jin | |
| 2020/0301565 | A1* | 9/2020 | Kuwabara | G02B 27/0179 |
| 2021/0152780 | A1* | 5/2021 | Hanayama | H04N 23/695 |

FOREIGN PATENT DOCUMENTS

| | | |
|---|---|---|
| JP | 2019015972 A | 1/2019 |
| JP | 2019016362 A | 1/2019 |
| KR | 1020150020649 A | 2/2015 |
| KR | 1020170043911 A | 4/2017 |

OTHER PUBLICATIONS

Written Opinion issued in Intl. Appln. No. PCT/JP2020/009091 dated May 26, 2020.

* cited by examiner

FIG. 5

| COUNT VALUE | DISPLAY TIME POSITION | AZIMUTH ANGLE Θ | ELEVATION ANGLE φ |
|---|---|---|---|
| 0 | 0:00 | 0 | 0 |
| 1 | 0:00 | 0 | 0 |
| 2 | 0:00 | 0 | 0 |
| 3 | 0:00 | 20 | 10 |
| 4 | 0:00 | 40 | 20 |
| 5 | 0:00 | 60 | 30 |
| 6 | 0:01 | 60 | 30 |
| 7 | 0:02 | 60 | 30 |
| 8 | 0:03 | 40 | 40 |
| ⋮ | ⋮ | ⋮ | ⋮ |

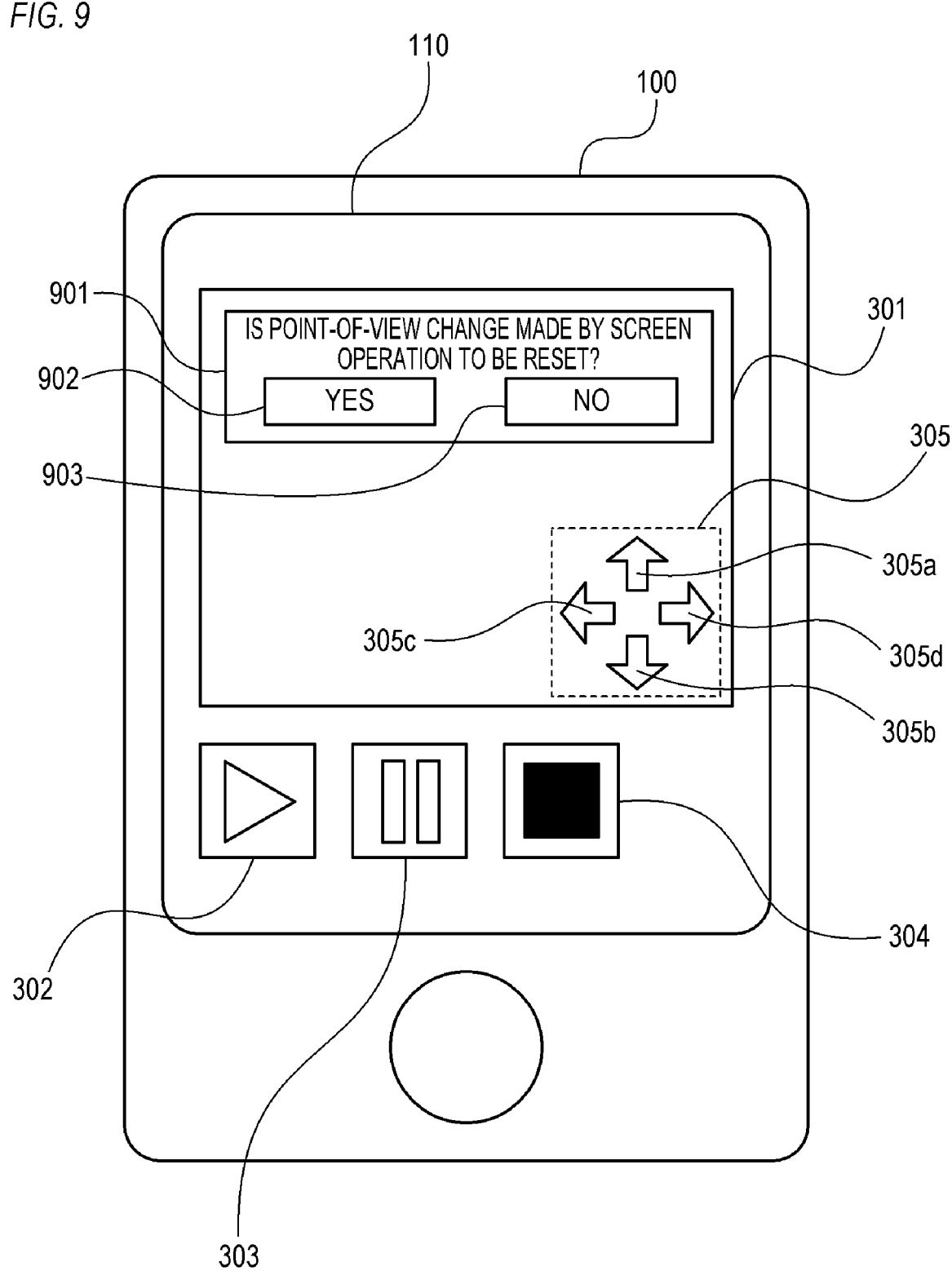

ELECTRONIC DEVICE, METHOD FOR CONTROLLING ELECTRONIC DEVICE, AND NON-TRANSITORY COMPUTER READABLE STORAGE MEDIUM

CROSS-REFERENCE TO RELATED APPLICATIONS

This application is a Continuation of International Patent Application No. PCT/JP2020/009091, filed Mar. 4, 2020, which claims the benefit of Japanese Patent Application No. 2019-051262, filed Mar. 19, 2019, both of which are hereby incorporated by reference herein in their entirety.

BACKGROUND OF THE INVENTION

Field of the Invention

The present invention relates to an electronic device, a method for controlling the electronic device, a program, and a storage medium, and particularly relates to a control method for causing an image having a wide video range to be displayed.

Background Art

There has conventionally been proposed a technique of displaying, on a display unit, a portion of an image having a wide-range video, such as a half-celestial sphere image or a celestial sphere image, as a display range and optionally changing a position of the display range in response to a change in an orientation of the display unit (inclination of a display surface), a user operation, or the like. There has also been proposed an image delivery technique of delivering an image thus used.

PTL 1 discloses a technique of controlling a direction of a time axis of a 360° video and a speed of reproduction thereof according to a direction of an inclination of a head-mounted display and a magnitude thereof.

According to the conventional technique, after the position of the display range is changed by changing the inclination of the display surface, it is possible to further change the position of the display range by performing the user operation. However, after the position of the display range is thus changed, even if the inclination of the display surface is returned to the original inclination, the position of the display range does not return to the original position, and consequently the position of the display range cannot easily be changed to an intended position. In other words, a user cannot change the position of the display range to an intended position by intuitively changing the inclination of the display surface.

CITATION LIST

Patent Literature

PTL 1 Japanese Patent Application Publication No. 2017-111539

SUMMARY OF THE INVENTION

The present invention provides a technique that allows a position of a display range to be easily changed to an intended position.

An electronic device according to the present invention includes: a processor; and a memory storing a program which, when executed by the processor, causes the electronic device to: detect an inclination of a display surface; receive a user operation; and perform control to display, as a display range, a portion of an image on the display surface, change a position of the display range in response to a change in the inclination of the display surface, and change the position of the display range in response to a user operation, wherein a second movement amount in which the display range moves in response to the change in the inclination of the display surface is corrected based on a first movement amount in which the display range is moved by the user operation.

Further features of the present invention will become apparent from the following description of exemplary embodiments with reference to the attached drawings.

BRIEF DESCRIPTION OF THE DRAWINGS

FIG. 5 is a diagram illustrating an example of information transmitted from the electronic device according to the first embodiment;

FIG. 9 is a diagram illustrating an example of a confirmation screen according to the first embodiment;

DESCRIPTION OF THE EMBODIMENTS

First Embodiment

Figure 1:
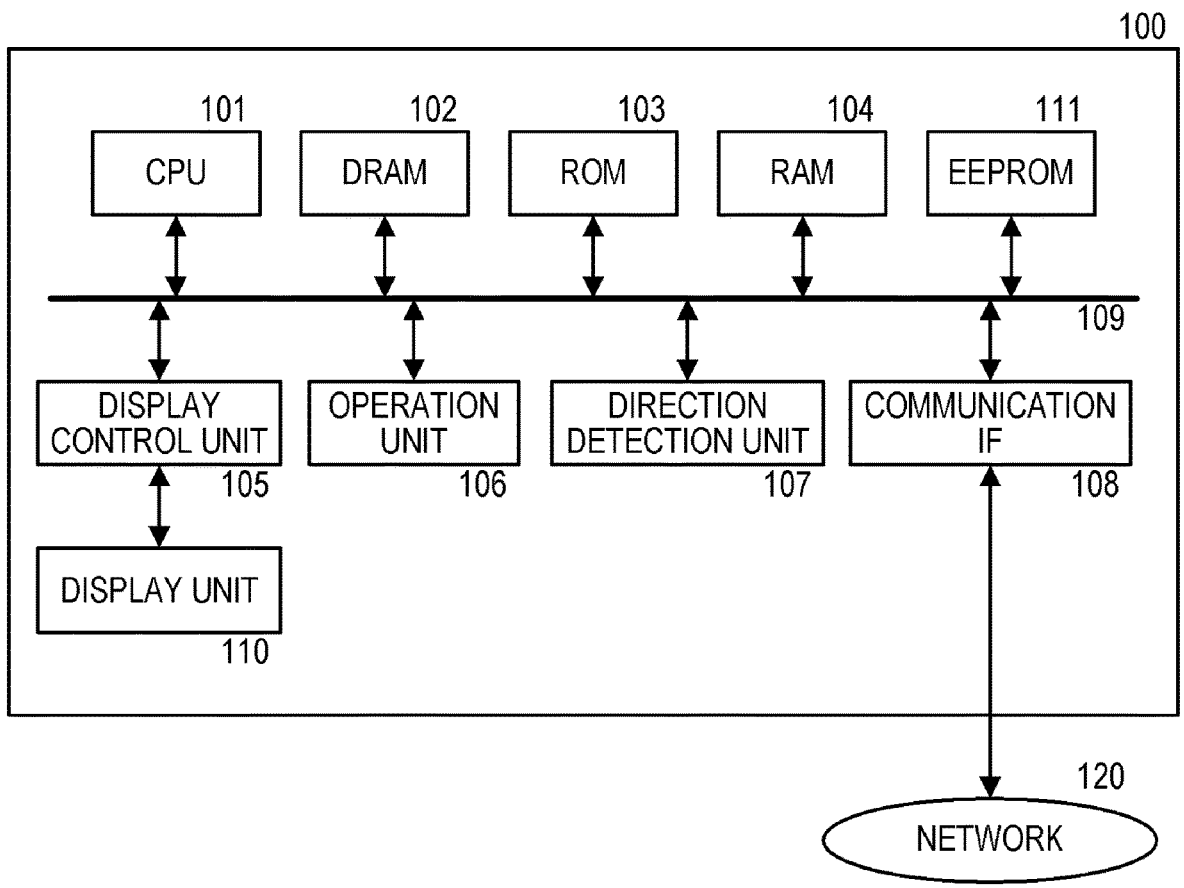
FIG. 1 is a hardware block diagram illustrating an example of a configuration of an electronic device according to a first embodiment.

A description will be given below of a first embodiment of the present invention. FIG. 1 is a hardware block diagram illustrating an example of a configuration of an electronic device 100 according to the present embodiment. The electronic device 100 is a smartphone, a head-mounted display, or the like. When the electronic device 100 is not the head-mounted display, the electronic device 100 may also be usable as a head-mounted display (HMD) by being attached to a head-mounted adapter. The head-mounted adapter is referred to also as a "VR (Virtual Reality) goggle".

The electronic device 100 (a CPU 101) displays a portion of an image (target image) as a display range on a display surface of a display unit 110. Note that the display unit 110 may also be a display device separate from the electronic device 100. For example, the electronic device 100 may be a personal computer (PC), a gaming machine, any reproduction device, or the like not having the display unit 110, while the display unit 110 may be a HMD connected to the electronic device 100 or the like.

The target image is a half-celestial sphere image, a celestial sphere image, or the like and has a video range (range in which a video is present; effective video range) wider than the display range when the target image is displayed at a normal magnification. The effective video range can also be said to be an "imaging range". The normal magnification is a magnification at which, e.g., neither enlargement nor reduction is implemented. The celestial sphere image is referred to also as an "omnidirectional image", a "360° image", a "360° panoramic image", or the like. The target image has the effective video range corresponding a maximum view field of 360 degrees (a vertical angle, an angle from a zenith, an elevation/depression angle, or an altitude angle) in a vertical direction and to a maximum view field of 360 degrees (a horizontal angle or an azimuth angle) in a lateral direction. Note that the effective video range of the target image may correspond to an elevation/depression angle of less than 360 degrees (e.g., 180 degrees (±90 degrees)) and may also correspond to an azimuth angle of less than 360 degrees (e.g., 180 degrees (±90 degrees)). The target image may be either a still image or a moving image. The present embodiment will describe an example in which the target image is a moving image.

The electronic device 100 (the CPU 101) optionally changes the position of the display range in response to a change in an orientation of the electronic device 100 (a change in an inclination of the display unit 110 (a display surface of the display unit 110)). This allows a user to change the position of the display range to an intended position by intuitively changing an orientation of the electronic device 100 in the vertical/lateral direction. In addition, the electronic device 100 (the CPU 101) optionally changes the position of the display range in response to a user operation (display position changing operation). This allows the user to change the position of the display range to the intended position without changing the orientation of the electronic device 100, a posture of the user, or the like. The user who can selectively perform the changing of the orientation of the electronic device 100 and the display position changing operation as appropriate can conveniently change the position of the display range. Examples of the display position changing operation include a touching operation (such as a tapping operation, a flicking operation, or a sliding operation) performed on a touch panel provided on the display surface of the display unit 110). The display position changing operation may also be an operation performed on a controller connected to the electronic device 100 or the like.

In a state where the electronic device 100 corresponding to the HMD is attached to a head region of the user, the user can visually recognize the display range displayed on the display unit 110 without manually holding the electronic device 100. In this case, when the user moves the head region or an entire body thereof, the orientation of the electronic device 100 (the display unit 110) also changes. Accordingly, the orientation of the electronic device 100 can be said otherwise to be a "orientation of the head region of the user (a direction in which a line of sight of the user is oriented)".

A display method that changes the position of the display range in response to a change in the orientation of the electronic device 100 (the display unit 110) is referred to as "VR display" or the like. The VR display allows the user to feel visual sensation (a sense of immersion or a sense of presence) as if being on-site in the target image (a VR space). The target image can also be said to be an "image having the effective video range that forms at least a portion of a virtual space (the VR space)". Such a method of displaying the target image as that used by the VR display is referred to as a "VR view" or the like, and an image that can be VR-displayed is referred to as a "VR image" or the like. Note that the target image may be or may not be the VR image.

As illustrated in FIG. 1, in the electronic device 100, a CPU 101, a DRAM 102, a ROM 103, a RAM 104, a display control unit 105, an operation unit 106, a direction detection unit 107, a communication IF 108, the display unit 110, and an EEPROM 111 are connected to an internal bus 109. The plurality of units connected to the internal bus 109 and described above can exchange data with each other via the internal bus 109.

The display unit 110 is a display device such as a liquid crystal panel. The ROM 103 stores various programs and various data. For example, in the ROM 103, a program for controlling overall processing (operation) by the electronic device 100, an application program for a video player described later, and the like are stored in advance. The CPU 101 executes the programs stored in the ROM 103 to control processing by each of the units of the electronic device 100. The DRAM 102 is a main memory of the electronic device 100. The RAM 104 is used as a work memory of the CPU 101. The EEPROM 111 is a nonvolatile memory capable of continuously storing information even when a power source of the electronic device 100 is turned OFF. The communication IF 108 performs communication with a network 120 such as the Internet in response to an instruction from the CPU 101.

The operation unit 106 is an input device that receives an operation (user operation). For example, the operation unit 106 includes a pointing device such as the touch panel. The touch panel outputs coordinate information corresponding to a contact position at which the user, a touch pen, or the like comes into contact with the touch panel and is stacked on the display surface of the display unit 110 so as to be, e.g., integrally configured with the display unit 110. Note that the display surface, the touch panel, and the like may be or may not be planarly configured. The CPU 101 controls, in response to an operation performed on the operation unit 106, processing by each of the units of the electronic device 100. Specifically, the operation unit 106 generates a control signal based on the operation performed on the operation unit 106 and supplies the control signal to the CPU 101. The CPU 101 controls, based on the control signal supplied from the operation unit 106, the processing by each of the units of the electronic device 100. Thus, it is possible to cause the electronic device 100 to perform an operation based on the user operation.

The display control unit 105 generates a display signal (such as an image signal or a drive signal for driving the display unit 110) for causing the display unit 110 to display an image and outputs the display signal to the display unit 110. The CPU 101 generates a display control signal corresponding to an image to be displayed on the display unit 110 and supplies the display control signal to the display control unit 105. The display control unit 105 generates a display signal based on the display control signal supplied from the CPU 101 and supplies the display signal to the display unit 110. The display unit 110 displays, based on the display signal supplied from the display control unit 105, an image on the display surface.

The direction detection unit 107 detects the orientation of the electronic device 100 (the inclination of the display unit 110 (the display surface of the display unit 110); the direction in which the electronic device 100 is oriented) and supplies a result of the detection to the CPU 101. In the present embodiment, the direction detection unit 107 notifies the CPU 101 of the direction (the elevation angle and the azimuth angle) in which the electronic device 100 (the display unit 110 (the display surface of the display unit 110)) is oriented as the detection result. The CPU 101 can determine (detect), based on information given thereto from the direction detection unit 107, the orientation (inclination) of the electronic device 100 or determine (detect) whether or not the orientation of the electronic device 100 has changed. As the direction detection unit 107, at least one of a plurality of sensors such as an acceleration sensor, a gyroscope sensor, a geomagnetic sensor, and an azimuth sensor can be used. As the direction detection unit 107, a combination of the plurality of sensors may also be used. Note that, when the display unit 110 is a display device separate from the electronic device 100, the direction detection unit 107 is provided in the display unit 110, while an interface that acquires the detection result from the direction detection unit 107 is provided in the electronic device 100.

Figure 2:
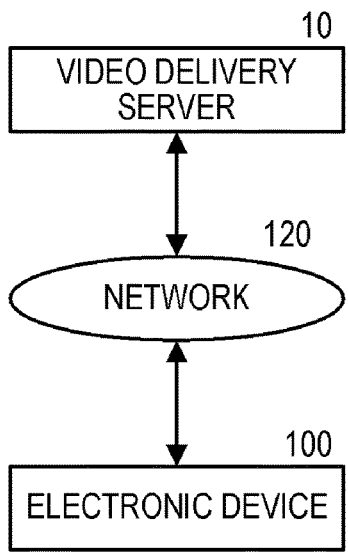
FIG. 2 is a diagram illustrating an example of a configuration of a video delivery system according to the first embodiment.

FIG. 2 is a diagram illustrating an example of a configuration of a video delivery system according to the present embodiment. In the video delivery system in FIG. 2, the electronic device 100 is connected to a video delivery server 10 via the network 120. The video delivery server 10 stores therein a video (target video) corresponding to the target image described above. The electronic device 100 transmits information on the display range and a display time position to the video delivery server 10. The display time position is a time position of the display target among a plurality of time positions included in a period from the start of the target video to the end thereof. When receiving the information on the display range and the display time position, the video delivery server 10 extracts, from target video data (video data of the target video), image data corresponding to the display range and the display time position and transmits the image data to the electronic device 100. Then, the electronic device 100 displays an image based on the received image data. Such processing is performed with each update timing with which the display on the electronic device 100 is updated.

Note that an image size of the image data extracted by the video delivery server 10 is not particularly limited. Enlargement or reduction of the image may be performed by the video delivery server 10 or may also be performed by the electronic device 100. When the video delivery server 10 performs the enlargement or reduction of the image, the image size of the image data extracted by the video delivery server 10 may vary. When the video delivery server 10 does not perform the enlargement or reduction of the image, the image size of the image data extracted by the video delivery server 10 does not vary. The electronic device 100 may also acquire the entire target video data, extracts the image data corresponding to the display range and the display time position from the target video data, and display the image data. The target video data may also be acquired from a device different from the video delivery server 10.

Figure 3:
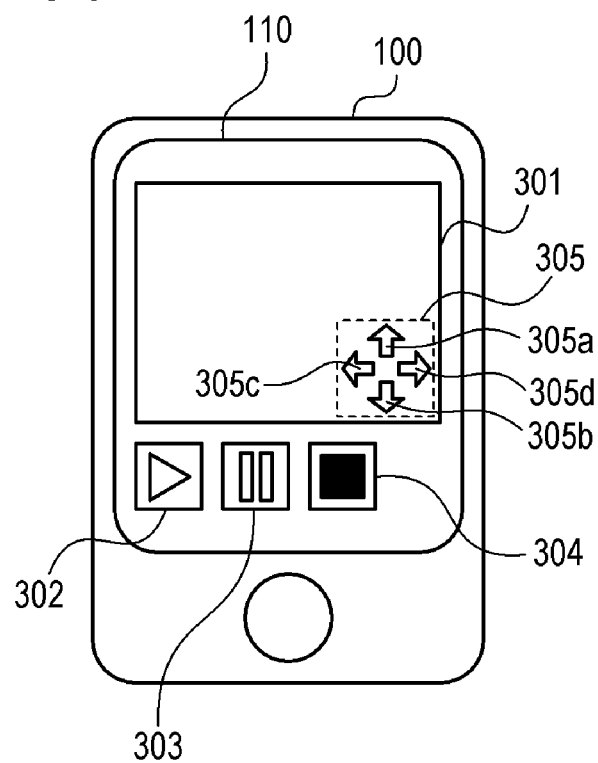
FIG. 3 is a diagram illustrating an example of a screen of a video player according to the first embodiment.

FIG. 3 is a diagram illustrating an example of a screen displayed on the electronic device 100. The screen in FIG. 3 is a screen of the video player. As illustrated in FIG. 3, the screen of the video player has a display area 301, a reproduction button 302, a pause button 303, a stop button 304, and display position change buttons 305. The display area 301 is an area in which the target video is displayed. The reproduction button 302 receives a user operation for reproducing the target video. The pause button 303 receives a user operation for pausing the target video. The stop button 304 receives a user operation for stopping the target video. Reproduction control (such as reproduction, pause, and stop) is performed by the CPU 101. The display position change buttons 305 receive a user operation for changing the position of the display range. In other words, in the present embodiment, the user operation performed on the display position change buttons 305 corresponds to the display position changing operation described above.

The operation unit 106 generates a control signal based on the user operation performed on the reproduction button 302, the pause button 303, the stop button 304, the display position change buttons 305, or the like and supplies the control signal to the CPU 101. Then, the CPU 101 controls, based on the control signal supplied from the operation unit 106, processing by each of the units of the electronic device 100. For example, when the user operation is performed on the reproduction button 302, the CPU 101 performs control based on the control signal such that the display time position is sequentially updated, and the information (the information on the display range and the display time position) is sequentially transmitted to the video delivery server 10. When the user operation is performed on the pause button 303, the CPU 101 performs control based on the control signal such that the display time position is not updated, and the information is sequentially transmitted to the video delivery server 10. When the user operation is performed on the stop button 304, the CPU 101 performs control based on the control signal such that the transmission of the information to the video delivery server 10 is stopped to prevent the target video from being displayed.

When the user operation is performed on any of the display position change buttons 305, the CPU 101 performs control based on the control signal supplied from the operation unit 106 such that the display range is updated, and the information (the information on the display range and the display time position) is sequentially transmitted to the video delivery server 10. In the example in FIG. 3, the display position change buttons 305 include an up-arrow button 305a, a down-arrow button 305b, a left arrow button 305c, and a right arrow button 305d. Every time the user operation is performed on the up-arrow button 305a, the display range moves one level upward while, every time the user operation is performed on the down-arrow button 305b, the display range moves one level downward. Every time the user operation is performed on the left arrow button 305c, the display range moves one level leftward while, every time the user operation is performed on the right arrow button 305d, the display range moves one level rightward.

Figure 4A:
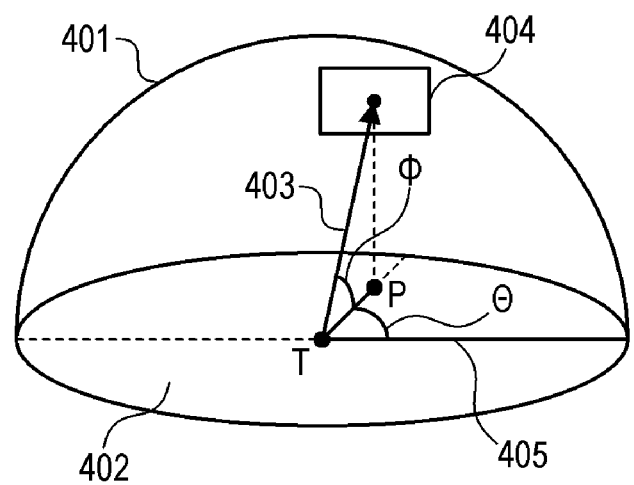
FIGS. 4A to 4C are diagrams illustrating an example of a method of determining a display range according to the first embodiment.
Figure 4B:
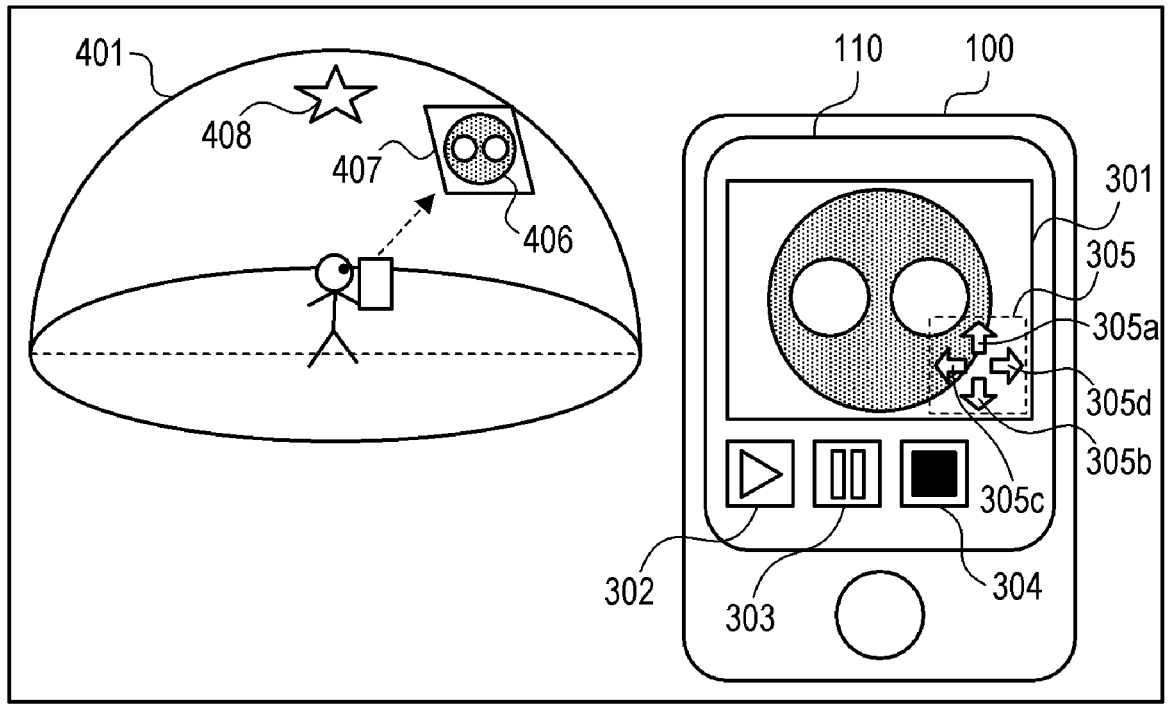
Figure 4C:
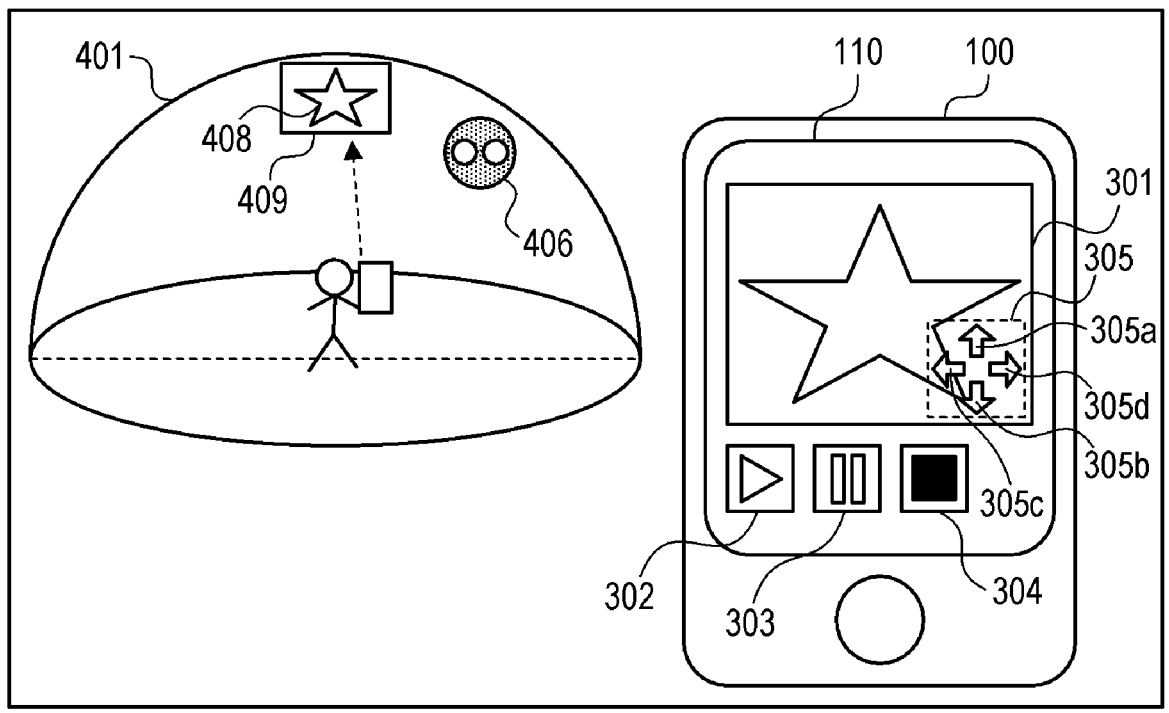

FIGS. 4(A) to 4(C) are diagrams each illustrating an example of a method of determining the display range. FIGS. 4(A) to 4(C) illustrate the example in which a hemispherical virtual space 401 is formed by the target video. It is assumed herein that, when the target video is reproduced by the electronic device 100, the electronic device 100 is located at a center of a reference surface (bottom surface) 402 in the virtual space 401. Note that a shape of the virtual space formed by the target video (target image) is not limited to a hemispherical shape. For example, a completely spherical virtual space may also be formed.

In FIG. 4(A), an arrow 403 indicates a direction in which the electronic device 100 is oriented in the virtual space 401. The direction of the arrow 403 can also be said to be a "direction in which the user is looking (viewing direction; point-of-view direction in the virtual space 401)". Of a surface of the virtual space 401, a range 404 in the direction of the arrow 403 is determined as the display range. The direction of the arrow 403 and a position of the display range 404 are represented using an azimuth angle Θ and an elevation angle Φ. The azimuth angle Θ is an angle between a reference line 405 on the reference surface 402 and a line connecting a center point T of the reference surface 402 and a point P reached by a line extending perpendicularly from a center of the display range 404 to the reference surface 402. The elevation angle Φ is an angle between the line connecting the center point T and the point P and a line connecting the center of the display range 404 and the center point T.

In FIG. 4(B), the user has the electronic device 100 pointed at an object 406 in the virtual space 401 (target video). Accordingly, a display range 407 including the object 406 is set, and the display range 407 is displayed in the display area 301. In FIG. 4(C), the user has the electronic device 100 pointed at an object 408 in the virtual space 401 (target video). Accordingly, a display range 409 including the object 408 is set, and the display range 409 is displayed in the display area 301. As illustrated in FIGS. 4(B) and 4(C), by changing the orientation of the electronic device 100, the user can freely change the position (the azimuth angle Θ and the elevation angle Φ) of the display range and can view any display range in the display area 301.

As also described above, the user can also freely change the position of the display range by performing the user operation on any of the display position change buttons 305 (the up-arrow button 305a, the down-arrow button 305b, the left arrow button 305c, and the right arrow button 305d). For example, every time the user operation is performed on the up-arrow button 305a, the elevation angle Φ increases one degree while, every time the user operation is performed on the down-arrow button 305b, the elevation angle Φ decreases one degree. Every time the user operation is performed on the left arrow button 305c, the azimuth angle Θ increases one degree while, every time the user operation is performed on the right arrow button 305d, the azimuth angle Θ decreases one degree.

Note that target video data forming the hemispherical virtual space 401 is stored in the video delivery server 10. The electronic device 100 uses the communication IF 108 to transmit the information (the azimuth angle Θ and the elevation angle Φ) generated by the direction detection unit 107 to the video delivery server 10. Then, the video delivery server 10 extracts, based on the information received from the electronic device 100 via the network 120 and as the target video data, the image data in the display range determined by the azimuth angle Θ and the elevation angle Φ. Then, the video delivery server 10 transmits the extracted image data to the electronic device 100 via the network 120. The electronic device 100 uses the communication IF 108 to receive the image data (the image data in the display range) transmitted from the video delivery server 10. Then, the CPU 101 of the electronic device 100 generates, based on the received image data, the display control signal, the display control unit 105 generates, based on the display control signal, the display signal, and the display unit 110 displays an image based on the display signal. Thus, the image in the display range is displayed on the display surface (in the display area 301) of the display unit 110. For processing of extracting (generating), from the target video data, the image data to be displayed on the electronic device, various proposed techniques can be used.

FIG. 5 is a diagram illustrating an example of information (data) transmitted from the electronic device 100 to the video delivery server 10. In the present embodiment, the electronic device 100 transmits the azimuth angle Θ and the elevation angle Φ as display range information (information on the display range). The electronic device 100 also transmits, as display time position information (information on the display time position), a time period elapsed from the start of the target video to the display time position. A count value in FIG. 5 is counted up with display update timing with which the display on the electronic device 100 is updated and managed by the electronic device 100. Every time the count value is counted up, the electronic device 100 transmits the display range information and the display time position information to the video delivery server 10.

In the example in FIG. 5, it is assumed that the count value is counted up every minute, i.e., the display on the electronic device 100 is updated every minute. At the count values 0 to 5, the target video is paused, and the display time position has stopped at 0:00 (minute:second). At the count value 6 and the subsequent count values, the target video is reproduced, and the display time position has advanced second by second from 0:01. At the count values 0 to 2, each of the azimuth angle Θ and the elevation angle Φ is 0°, and the video data in a direction defined by the azimuth angle Θ and the elevation angle Φ is displayed. At the count value 3 and the subsequent count values, a change has occurred in each of the azimuth angle Θ and the elevation angle Φ, and a change has occurred in the direction of the image data displayed on the electronic device 100, i.e., in the position of the display range.

Figure 6:
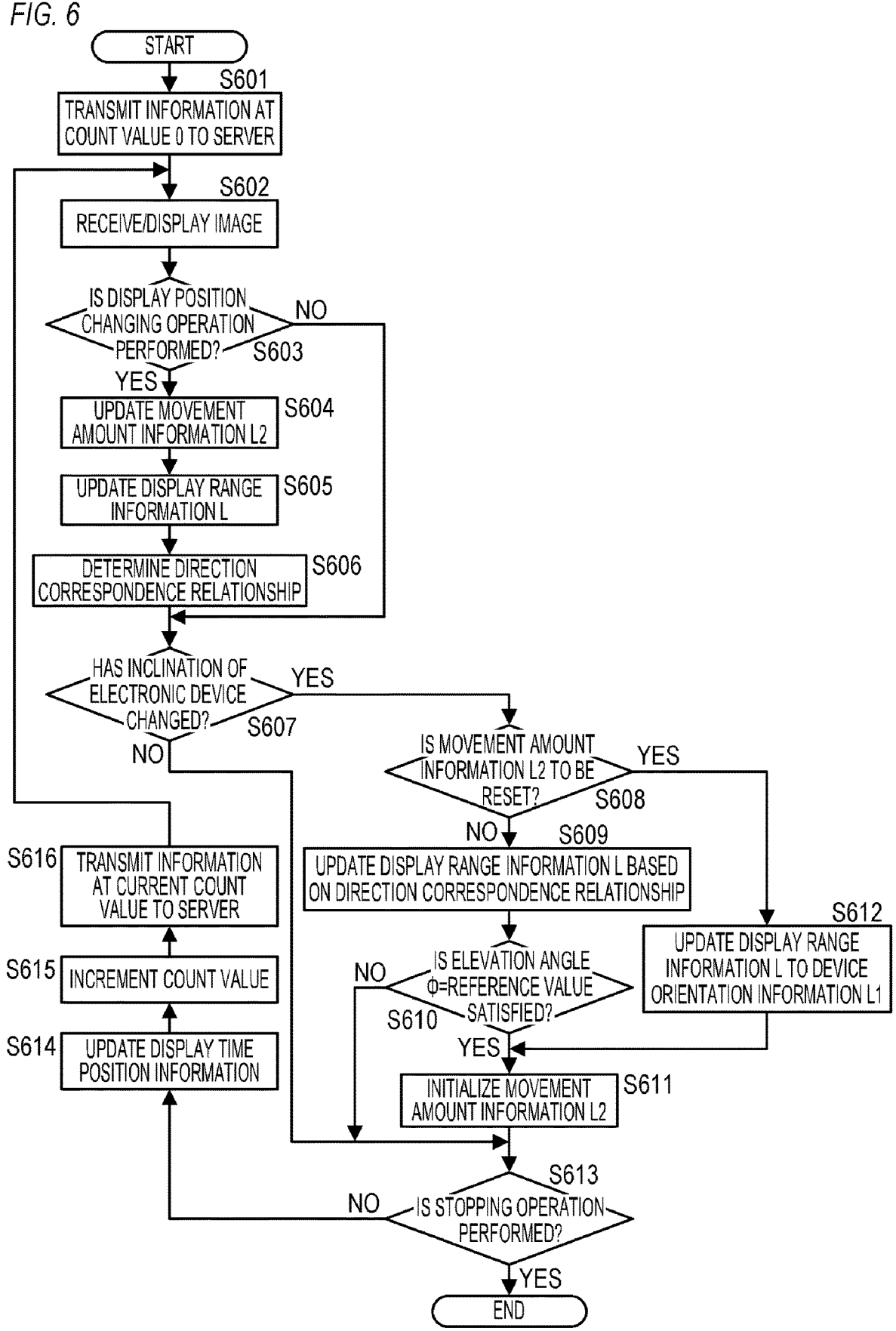
FIG. 6 is a flow chart illustrating an example of display control processing.

FIG. 6 is a flow chart illustrating an example of display control processing performed in the electronic device 100. The CPU 101 develops, in the RAM 104, the application program for the video player stored in the ROM 103 and executes the application program to thus implement each of processing steps in the flow chart of FIG. 6. It is assumed herein that the target video is determined in advance. Additionally, device orientation information L1 representing a direction (an azimuth angle Θ1 and an elevation angle Φ1) in which the electronic device 100 (the display unit 110 (the display surface of the display unit 110)) is oriented is referred to as the "device orientation information L1 (Θ1, Φ1)". Still additionally, movement amount information L2 representing a movement amount (an azimuth angle change amount Θ2 and an elevation angle change amount Φ2) in which the display range (viewing direction) is moved by the display position changing operation (the user operation performed on the display position change buttons 305) is referred to as the "movement amount information L2 (Θ2, Φ2)". Yet additionally, the display range information L (information representing the display range (the azimuth angle Θ and the elevation angle Φ) to be transmitted to the video delivery server 10 is referred to as the "display range information L (Θ, Φ)".

Before the display control processing in FIG. 6 is described, a description will be given of a problem to be solved by the present embodiment (the display control processing in FIG. 6). Consideration is given herein to a case where the position of the display range can optionally be changed in response to a change in the orientation of the display unit (the inclination of the display surface) and to the display position changing operation. In this case, after the position of the display range is changed by changing the inclination of the display surface, the position of the display range can further be changed by performing the display position changing operation. However, after the position of the display range is thus changed, even though the inclination of the display surface is returned to the original inclination, the position of the display range is not returned to the original position, and consequently the position of the display range cannot easily be changed to an intended position. In other words, a user cannot change the position of the display range to an intended position by intuitively changing the inclination of the display surface.

Figure 7A:
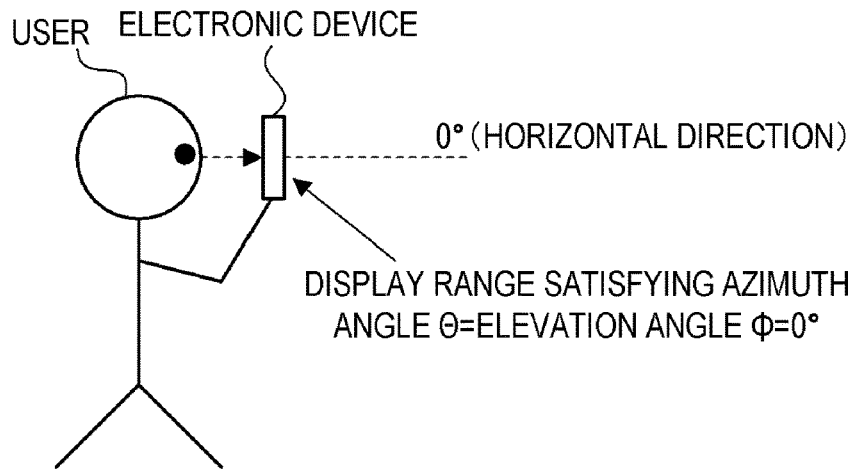
FIGS. 7A to 7C are diagrams illustrating an example of a problem to be solved by the first embodiment.
Figure 7B:
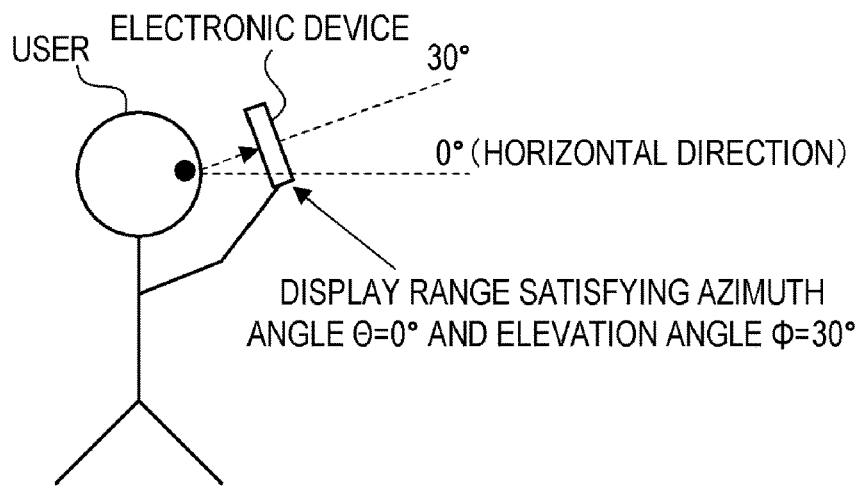
Figure 7C:
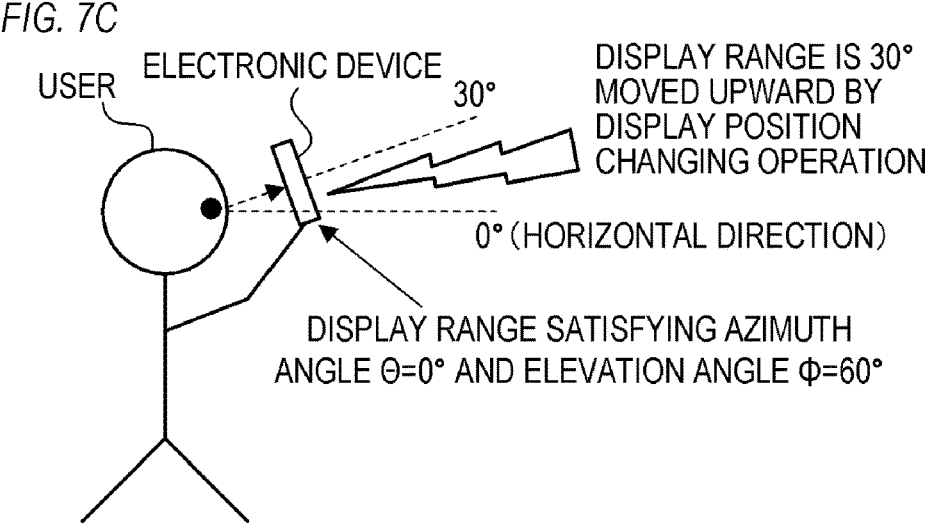

For example, consideration is given of a case where the electronic device oriented in the horizontal direction to be in a state where a range satisfying AZIMUTH ANGLE Θ=ELEVATION ANGLE Φ=0° is displayed as illustrated in FIG. 7(A) is inclined 30° upward as illustrated in FIG. 7(B). In this case, the display range vertically moves to update the range satisfying AZIMUTH ANGLE Θ=ELEVATION ANGLE Φ=0° to a range satisfying AZIMUTH ANGLE Θ=0° and ELEVATION ANGLE Φ=30°. Then, when the display position changing operation is performed, the display range further moves. For example, the display range vertically moves in a change amount Φ2=30° as illustrated in FIG. 7(C) to update the range satisfying AZIMUTH ANGLE Θ=0° and ELEVATION ANGLE Φ=30° to a range satisfying AZIMUTH ANGLE Θ=0° and ELEVATION ANGLE Φ=60°. Then, when the electronic device is oriented in the horizontal direction, the change amount Φ2=30° remains unchanged, and consequently the display range does not return to the range satisfying AZIMUTH ANGLE Θ=ELEVATION ANGLE Φ=0°, and results in the range satisfying AZIMUTH ANGLE Θ=0° and ELEVATION ANGLE Φ=30°. Thus, even when the electronic device is oriented in the horizontal direction, the user cannot return the display range to the range satisfying AZIMUTH ANGLE Θ=ELEVATION ANGLE Φ=0°.

Accordingly, in the display control processing in FIG. 6, processing of correcting, based on the movement amount (the change amount Θ2, Φ2) in which the display range is moved by the display position changing operation, the movement amount in which the display range moves in response to a change in the inclination of the display surface or the like is performed. This allows the position of the display range to be easily changed to an intended position.

In Step S601 in FIG. 6, the CPU 101 acquires the device orientation information L1 (Θ1, Φ1) from the direction detection unit 107 and records the device orientation information L1 (Θ1, Φ1) in the RAM 104. In the state in FIG. 7(B), the device orientation information L1 (Θ1=0°, Φ1=30°) is acquired. The CPU 101 further records each of the display range information L (Θ, Φ) and the movement amount information L2 (Θ2, Φ2) in the RAM 104. In Step S601, there is no movement of the display range due to the display position changing operation. Accordingly, the CPU 101 records each of the display range information L (Θ=Θ1, Φ=Φ1) and the movement amount information L2 (Θ2=0°, Φ2=0°) in the RAM 104. Then, the CPU 101 transmits, as information at the count value 0, the display range information L (Θ=Θ1, Φ=Φ1) and the display time position information to the video delivery server 10. The display time position information at the count value 0 represents, e.g., a time position (0:00) of a leading frame of the target video. Note that the display time position information at the count value 0 may also represent another time position. For example, information representing a time position at which reproduction of the target video was previously stopped may also be used as the display time position information at the count value 0. Such a time position can be managed by at least one of the electronic device 100 and the video delivery server 10.

In Step S602, the CPU 101 uses the communication IF 108 to receive the image data (the image data in the display range) from the video delivery server 10, and records the received image data in the RAM 104. Then, the CPU 101 uses the display control unit 105 to display, on the display unit 110, the image (the image in the display range) based on the image data stored in the RAM 104.

In Step S603, the CPU 101 determines whether or not the display position changing operation (the user operation performed on any of the display position change buttons 305) is performed. By monitoring the control signal output from the operation unit 106, it is possible to make the determination in Step S603. When it is determined that the display position changing operation is performed, the processing is advanced to Step S604 and, when it is determined that the display position changing operation is not performed, the processing is advanced to Step S607.

In Step S604, the CPU 101 acquires, from the operation unit 106, the movement amount information L2 (Θ2, Φ2) corresponding to the display position changing operation. Then, the CPU 101 updates the movement amount information L2 (Θ2, Φ2) stored in the RAM 104 to the movement amount information L2 (Θ2, Φ2) acquired from the operation unit 106. In the state in FIG. 7(C), the movement amount information L2 (Θ2=0°, Φ2=30°) is acquired.

In Step S605, the CPU 101 updates the display range information L (0, 1) stored in the RAM 104 based on the device orientation information L1 (Θ1, Φ1) and the movement amount information L2 (Θ2, Φ2) which are stored in the RAM 104. Specifically, using Expressions 1 and 2 shown below, the post-update azimuth angle Θ and the post-update elevation angle Φ are calculated, and the display range information L (Θ, Φ) stored in the RAM 104 is updated. When there is a change from the state in FIG. 7(B) to the state in FIG. 7(C), the post-update azimuth angle Θ=0° and the post-update elevation angle Φ=60° are calculated, and the display range information L (Θ, Φ) is updated to the display range information L (Θ=0°, Φ=60°).

$$\Theta = \Theta_1 + \Theta_2 \quad \text{(Expression 1)}$$

$$\Phi = \Phi_1 + \Phi_2 \quad \text{(Expression 2)}$$

Figure 8A:
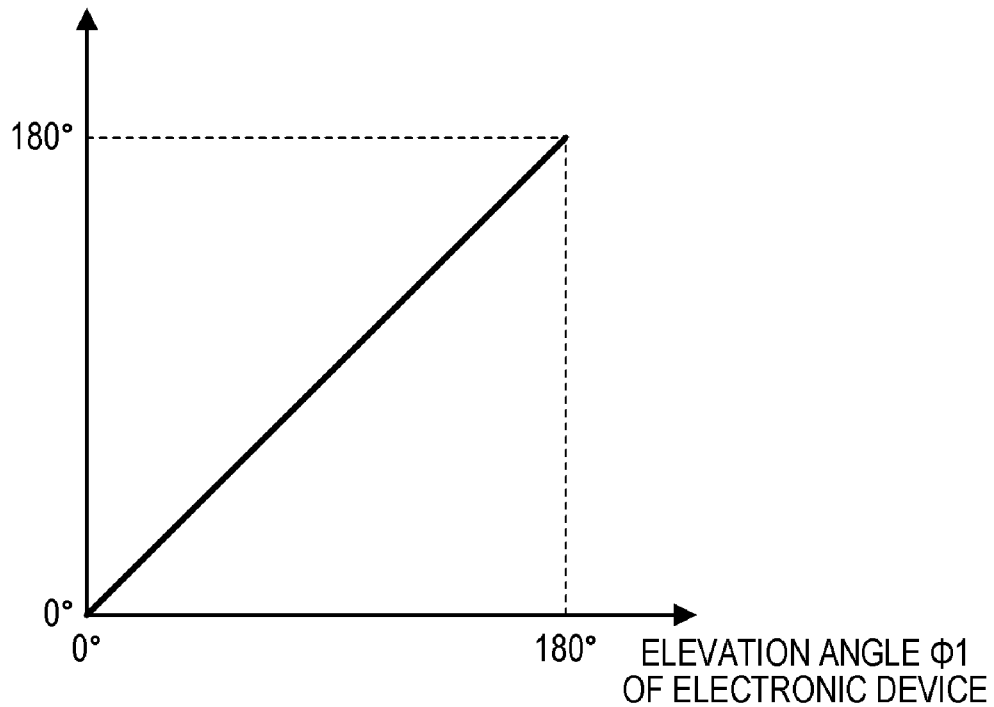
FIGS. 8A and 8B are diagrams illustrating examples of a direction correspondence relationship according to the first embodiment.
Figure 8B:
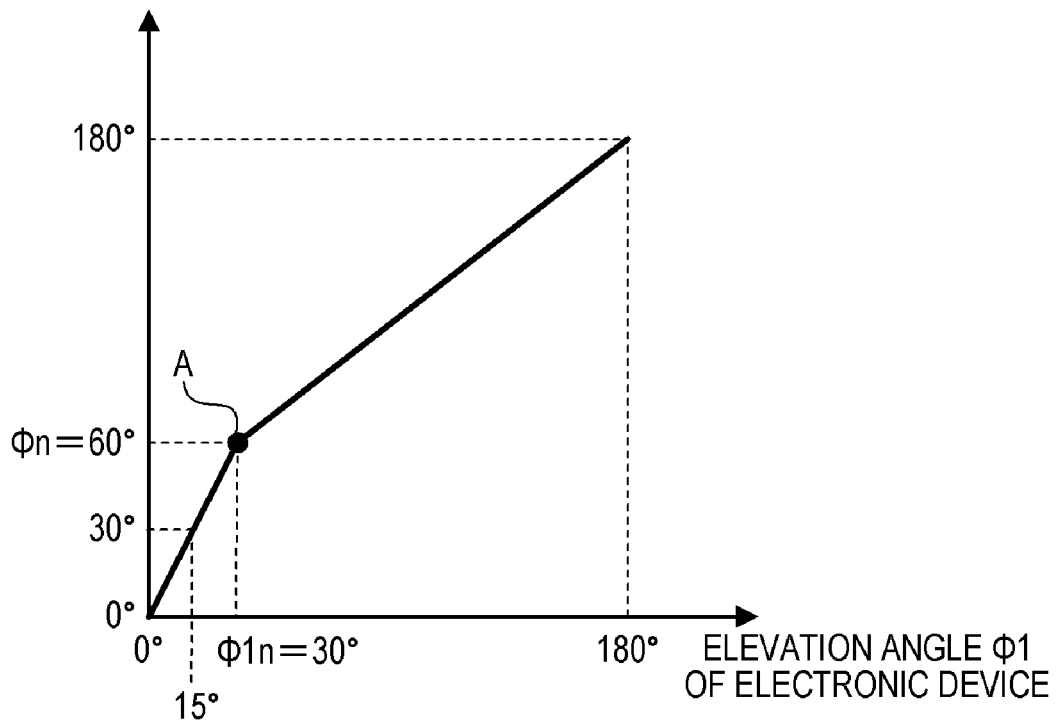

In Step S606, the CPU 101 determines a correspondence relationship (direction correspondence relationship) between the elevation angle Φ1 of the electronic device 100 (the display unit 110 (the display surface of the display unit 110)) and the elevation angle Φ of the display range. FIG. 8(A) illustrates the direction correspondence relationship in an initial state, such as the direction correspondence relationship before the display position changing operation is performed or the direction correspondence relationship in a state represented by the movement amount information L2 (Θ2=0°, Φ2=0°). In the direction correspondence relationship in the initial state, the elevation angle Φ of the display range is equal to the elevation angle Φ1 of the electronic device 100. When there is a change from the state in FIG. 7(B) to the state in FIG. 7(C), in Step S606, the direction correspondence relationship illustrated in FIG. 8(B) is determined. An elevation angle Φn at a point A in FIG. 8(B) is ELEVATION ANGLE Φ=Φ1+Φ2=60° (the display range information L (Θ, Φ) stored in the RAM 104 at a time when Step S606 is performed. An elevation angle Φ1n at the point A is ELEVATION ANGLE Φ1=30° (the device orientation information L1 (Θ1, Φ1)) stored in the RAM 104 at the time when Step S606 is performed.

Consideration is given herein to a case where the display range is determined using the direction correspondence relationship illustrated in FIG. 8(B). In that case, the display range is determined such that, in response to a change in the inclination of the electronic device 100 which brings the direction in which the electronic device 100 (the display unit 110 (the display surface of the display unit 110)) is oriented closer to a specified direction, the display range continuously moves to a position corresponding to the inclination of the electronic device 100. In the present embodiment, the specified direction is the horizontal direction (direction in which the elevation angle $\Phi1$ of the electronic device 100 is 0° or 180°). The "position corresponding to the inclination of the electronic device 100" is a position for which no consideration is given to the change amount $\Phi2$ (the movement amount information L2 ($\Theta2$, $\Phi2$)) and where the elevation angle $\Phi$ of the display range is equal to the elevation angle $\Phi1$ of the electronic device 100.

Note that the elevation angle $\Phi$ represented by the direction correspondence relationship in FIG. 8(B) is an elevation angle obtained by correcting the elevation angle 11 based on the change amount $\Phi2$. Accordingly, the direction correspondence relationship in FIG. 8(B) can also be said to be a "correspondence relationship that corrects an amount of change of the elevation angle $\Phi$ resulting from a change in the elevation angle $\Phi1$ based on the change amount $\Phi2$". Note that the change amount $\Phi2$ can also be said to be a "movement amount in which the display range is moved in the virtual direction (an elevation angle direction) by the display position changing operation". The amount of change of the elevation angle $\Phi$ resulting from the change in the elevation angle $\Phi1$ can also be said to be a "movement amount in which the display range moves in the vertical direction (the elevation angle direction) in response to the change in the inclination of the display surface in the elevation angle direction".

In Step S607, the CPU 101 acquires the device orientation information L1 ($\Theta1$, $\Phi1$) from the direction detection unit 107 and records the device orientation information L1 ($\Theta1$, $\Phi1$) in the RAM 104 (updating of the device orientation information L1 ($\Theta1$, $\Phi1$)). At this time, the CPU 101 determines whether or not the inclination of the electronic device 100 (the display unit 110 (the display surface of the display unit 110)) has changed. In the present embodiment, the CPU 101 determines whether or not the inclination of the electronic device 100 has changed in a change amount larger than a threshold. Specifically, the CPU 101 compares the pre-update device orientation information L1 ($\Theta1$, $\Phi1$) to the post-update device orientation information L1 ($\Theta1$, $\Phi1$) to determine whether or not the amount of change of the elevation angle $\Phi1$ is larger than the threshold. When the amount of change of the elevation angle $\Phi1$ is determined to be larger than the threshold, the processing is advanced to Step S608 and, when the amount of change of the elevation angle $\Phi1$ is determined to be equal to or smaller than the threshold, the processing is advanced to Step S613.

Note that the threshold may be zero or may be larger than zero. The threshold may be or may not be a value determined in advance by a manufacturer or the like. For example, the threshold may also be a value (changeable value) specified by the user. In the present embodiment, when the elevation angle $\Phi1$ does not change even though the azimuth angle $\Theta1$ has changed, it is determined that the inclination of the electronic device 100 has not changed. However, in such a case, it may also be determined that the inclination of the electronic device 100 has changed. In other words, it may also be possible to determine whether or not the inclination of the electronic device 100 has changed in further consideration of a change in the azimuth angle $\Theta1$.

In Step S608, the CPU 101 determines whether or not the movement amount information L2 ($\Theta2$, $\Phi2$) (the movement amount in which the display range is moved by the display position changing operation) is to be reset. In the present embodiment, the CPU 101 uses the display control unit 105 to display, on the display surface, a confirmation screen for whether or not the movement amount information L2 ($\Theta2$, $\Phi2$) is to be reset. Then, the CPU 101 determines, in response to a user operation responding to the confirmation screen, whether or not the movement amount information L2 ($\Theta2$, $\Phi2$) is to be reset. FIG. 9 illustrates an example of the reconfirmation screen. A confirmation screen 901 is displayed in superimposition on the screen (FIG. 3) of the video player. To inquire of the user whether or not the movement amount information L2 ($\Theta2$, $\Phi2$) is to be reset, the confirmation screen 901 displays a message such as "IS POINT-OF-VIEW CHANGE MADE BY SCREEN OPERATION TO BE RESET?". In addition, the confirmation screen 901 displays a YES button 902 and a NO button 903. When the movement amount information L2 ($\Theta2$, $\Phi2$) is to be reset, the user presses the YES button 902 and, when the movement amount information L2 ($\Theta2$, $\Phi2$) is not to be reset, the user presses the NO button 903. The pressing of the YES button 902, the NO button 903, or the like is reported from the operation unit 106 to the CPU 101. When it is determined that the movement amount information L2 ($\Theta2$, $\Phi2$) is to be reset, the processing is advanced to Step S612. When it is determined that the movement amount information L2 ($\Theta2$, $\Phi2$) is not to be reset, the processing is advanced to Step S609. Consequently, in the present embodiment, one of the processing in S609 and the processing in S612 is selected and performed.

Note that a method of selecting one of the processing in Step S609 and the processing in Step S612 is not limited to the method described above which displays the confirmation screen. For example, it may be possible that, at the start of the display control processing in FIG. 6 or the like, the processing to be performed (one of the processing in Step S609 and the processing in Step S612) is set in advance. It may also be possible that the processing is constantly advanced from Step S608 to Step S609 without involving the selection of one of the processing in Step S609 and the processing in Step S612. It may also be possible that the processing is constantly advanced from Step S608 to Step S612.

In Step S609, the CPU 101 acquires, from the direction correspondence relationship determined in Step S606, the elevation angle $\Phi$ corresponding to the elevation angle $\Phi1$ (the device orientation information L1 ($\Theta1$, $\Phi1$) after the update in Step S607) stored in the RAM 104. For example, when the direction correspondence relationship in FIG. 8(B) is determined in Step S606 and the elevation angle $\Phi1=15°$ is stored in the RAM 104, the elevation angle $\Phi=30°$ at a point B is acquired. Then, the CPU 101 updates the display range information L ($\Theta$, $\Phi$) stored in the RAM 104 such that the acquired elevation angle $\Phi$ is shown. As a result, the amount of change of the elevation angle $\Phi$ resulting from the change in the elevation angle $\Phi1$ is corrected based on the change amount $\Phi2$, and consequently the display range moves in a post-correction change amount (the amount of change of the elevation angle $\Phi$). When the electronic device 100 (the display unit 110 (the display surface of the display unit 110)) is oriented in the horizontal direction (the specified direction), the change amount $\Phi2$ is not reflected, and the display range (the display range satisfying ELEVATION ANGLE $\Phi=\Phi1$) based on the elevation angle $\Phi1$ is determined.

In Step S610, the CPU 101 determines whether or not the electronic device 100 (the display unit 110 (the display surface of the display unit 110)) is oriented in the horizontal direction (the specified direction). Specifically, the CPU 101 determines whether or not the elevation angle Φ after the update in Step S609 has a reference value (0° or 180°). In the direction correspondence relationship (FIG. 8(B)) determined in Step S606, when the elevation angle Φ of the display range has the reference value, the elevation angle Φ of the display range is equal to the elevation angle Φ1 of the electronic device 100. Accordingly, when the elevation angle Φ after the update in Step S609 has the reference value, the electronic device 100 is oriented in the horizontal direction. When it is determined that the elevation angle Φ has the reference value, the processing is advanced to Step S611 and, when it is determined that the elevation angle Φ does not have the reference value, the processing is advanced to Step S613.

In Step S611, the CPU 101 updates (initializes) the movement amount information L2 (Θ2, Φ2) stored in the RAM 104 to the movement amount information L2 (0,0). In addition, the CPU 101 returns (initializes) the direction correspondence relationship from the direction correspondence relationship determined in Step S606 to the direction correspondence relationship in FIG. 8(A). In other words, the CPU 101 resets the movement amount information L2 (Θ2, Φ2) and the direction correspondence relationship.

After the processing in Step S612, the processing (the resetting of the movement amount information L2 (Θ2, Φ2)) in Step S611 is inevitably performed. Consequently, in Step S612, the CPU 101 updates the display range information L (Θ, Φ) stored in the RAM 104 to the device orientation information L1 (Θ1, Φ1) stored in the RAM 104. In other words, the CPU 101 updates the display range information L (Θ, Φ) to the information in which the movement amount information L2 (Θ2, Φ2) is not reflected.

In Step S613, the CPU 101 determines whether or not a stopping operation (the user operation performed on the stop button 304) is performed. By monitoring the control signal output from the operation unit 106, it is possible to make the determination in Step S613. When it is determined that the stopping operation is performed, the CPU 101 uses the display control unit 105 to end the display of the target video and end the display control processing in FIG. 6. When it is determined that the stopping operation is not performed, the processing is advanced to Step S614.

In Step S614, the CPU 101 updates the display time position information. Specifically, the CPU 101 determines whether or not a reproducing operation (the user operation performed on the reproduction button 302) or a pausing operation (the user operation performed on the pause button 303) is performed. By monitoring the control signal output from the operation unit 106, it is possible to make the determination. Then, during a period after the reproducing operation is performed and before the pausing operation is performed, the CPU 101 sequentially updates the display time position information such that the display time position advances to increase a time period elapsed from the start of the target video to the display time position. Note that, during a period after the pausing operation is performed and before the reproducing operation is performed, the CPU 101 does not update the display time position information.

In Step S615, the CPU 101 increments the count value by one.

In Step S616, the CPU 101 transmits, as information on the count value after the update in Step S615, the display time position information after the update in Step S614 and the display range information L (Θ, Φ) stored in the RAM 104 to the video delivery server 10.

As described above, according to the present embodiment, based on the movement amount in which the display range is moved by the display position changing operation, the processing of correcting the movement amount in which the display range moves in response to the change in the inclination of the display surface or the like is performed. This allows the position of the display range to be easily changed to the intended position. For example, even after the position of the display range is changed by the display position changing operation, by returning the inclination of the display surface to the original inclination, it is possible to return the position of the display range to the original position.

While the example in which the amount of change of the elevation angle Φ of the display range resulting from the change in the elevation angle Φ1 of the display surface is corrected based on the change amount Φ2 (the amount of change of the elevation angle Φ of the display range) resulting from the display position changing operation has been described, correction is not limited thereto. For example, it may also be possible to correct an amount of change of the azimuth angle Θ of the display range resulting from a change in the azimuth angle Θ1 of the display surface based on the change amount Θ2 (the amount of change of the azimuth angle Θ of the display range) resulting from the display position changing operation. Only one of the azimuth angle Θ and the elevation angle Φ may be corrected appropriately or, alternatively, both of the azimuth angle Θ and the elevation angle Φ may be corrected appropriately. In addition, the specified direction may be a direction different from the horizontal direction. For example, the specified direction may be a direction in which the azimuth angle Θ1 is 90° or, alternatively, the specified direction may be a direction satisfying AZIMUTH ANGLE Θ1=ELEVATION ANGLE Φ1=45°.

It may also be possible that, in a state in which the display surface is oriented in the specified direction (such as the horizontal direction), the CPU 101 does not change the position of the display range in response to the display position changing operation. By doing so, even when the display position changing operation is unintentionally performed, the user can continue to look in the specified direction.

Second Embodiment

A description will be given below of a second embodiment of the present invention. Note that a detailed description will be given below of a point (such as a configuration or processing) different from that in the first embodiment, and a description of the same point as in the first embodiment is omitted.

Figure 10:
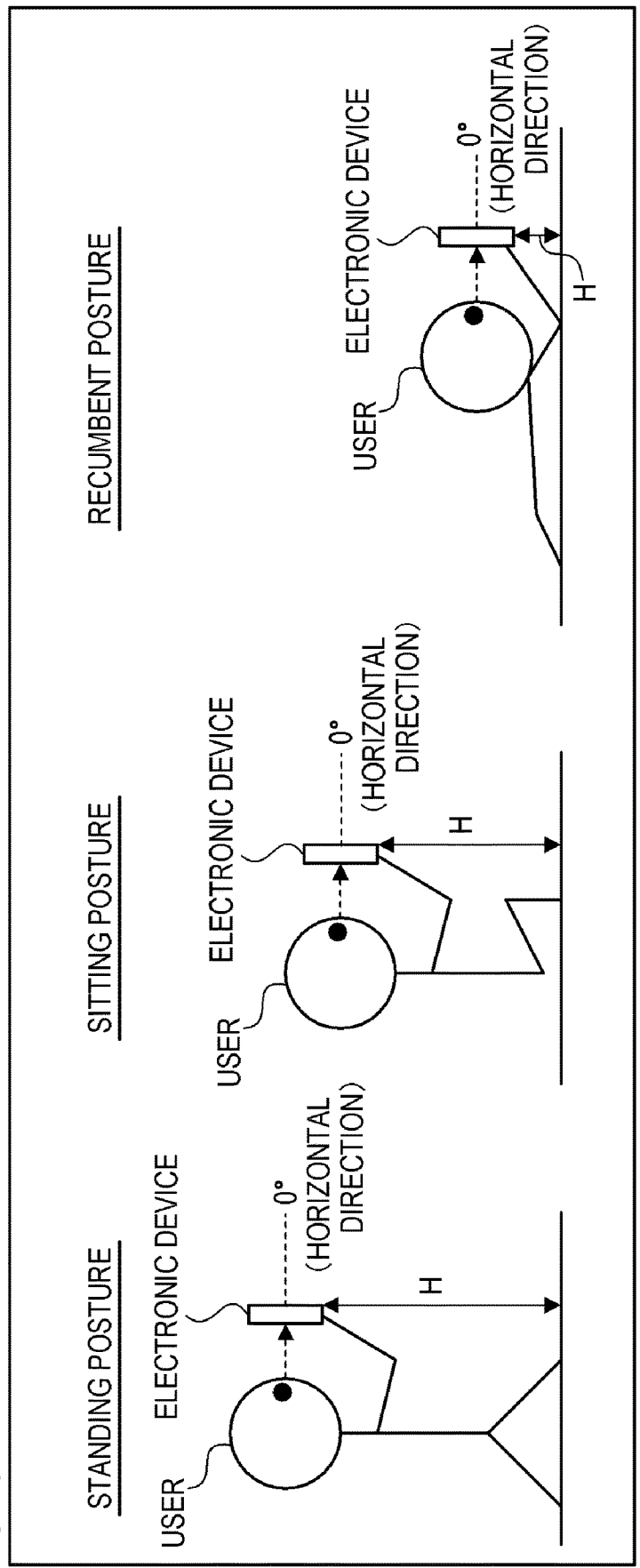
FIG. 10 is a diagram illustrating an example of a posture of a user according to a second embodiment.

In the present embodiment, the direction detection unit 107 further detects a posture (body posture) of the user of the electronic device 100 (posture detection). Specifically, the direction detection unit 107 uses a gyroscope sensor to detect a height H at which the electronic device 100 is located. FIG. 10 illustrates an example of a correspondence relationship between the height H at which the electronic device 100 is located and the posture of the user. As illustrated in FIG. 10, when the posture of the user changes between a standing posture, a sitting posture, a recumbent posture, and the like, the height H at which the electronic device 100 is located also changes. Therefore, it can be said that the height at which the electronic device 100 is located is a "parameter corresponding to the posture of the user". When the posture of the user has changed, it is highly possible that the user intends to perform the display position changing operation again. Accordingly, in the present embodiment, the CPU 101 determines, based on the detection result from the direction detection unit 107, whether or not the posture of the user has changed and, when determining that the posture of the user has changed, the CPU 101 resets the movement amount information L2 ($\Theta 2$, $\Phi 2$) as appropriate.

Figure 11:
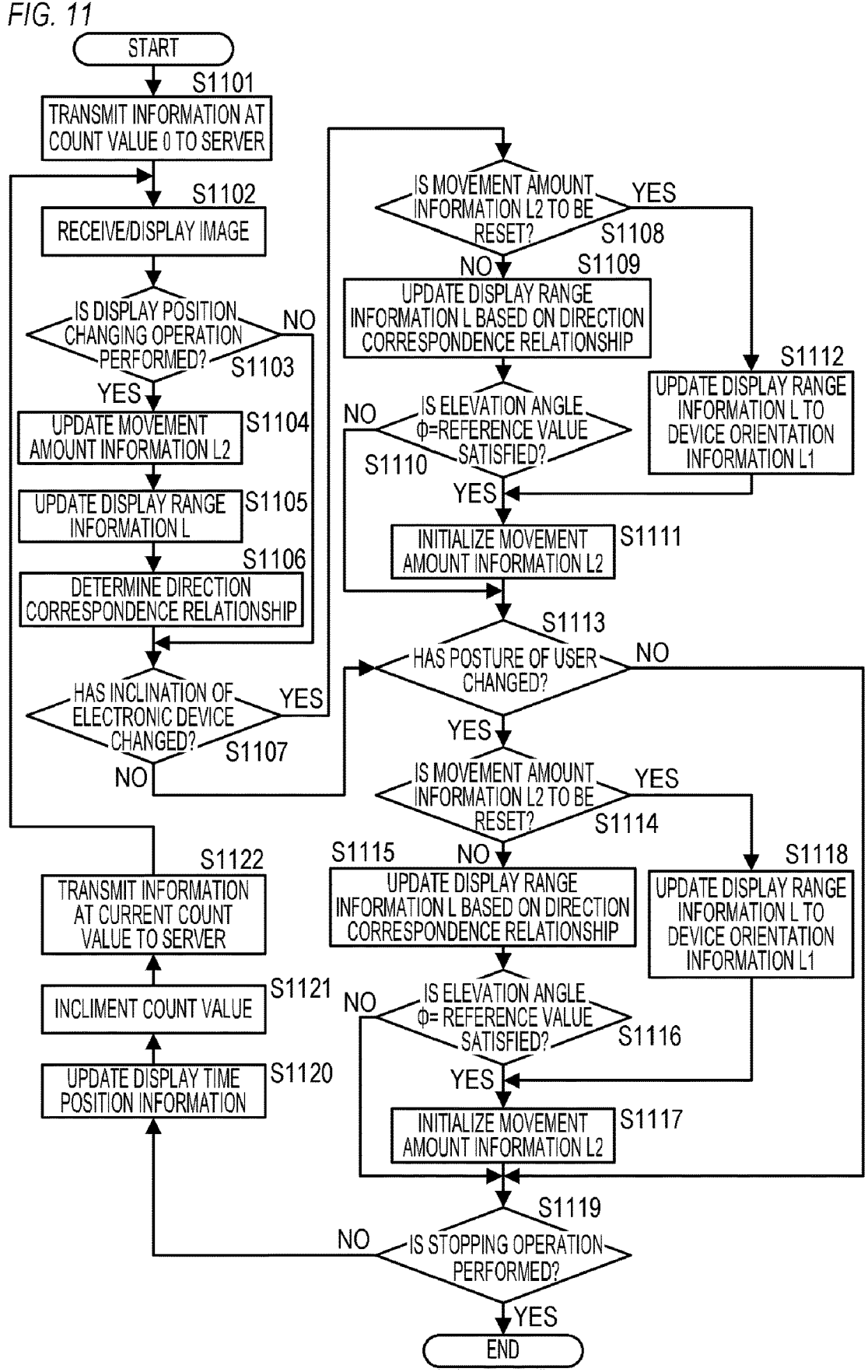
FIG. 11 is a flow chart illustrating an example of display control processing according to the second embodiment.

FIG. 11 is a flow chart illustrating an example of the display control processing according to the present embodiment. The CPU 101 develops, in the RAM 104, the application program for the video player stored in the ROM 103 and executes the application program to thus implement each of processing steps in the flow chart of FIG. 11.

The processing steps in Steps S1101 to S1112 are the same as the processing steps in Steps S601 to S612 in FIG. 6.

In Step S1113, the CPU 101 uses the direction detection unit 107 to determine whether or not the posture (body posture) of the user has changed. In the present embodiment, the CPU 101 determines whether or not the posture of the user has changed in a change amount larger than a threshold. Specifically, the direction detection unit 107 detects the height H at which the electronic device 100 is located and reports the height H to the CPU 101. Then, the CPU 101 determines whether or not the amount of change of the reported height H (such as an amount of change from the previously reported height H or an amount of change per given time period) is larger than the threshold. When it is determined that the amount of change of the height H is larger than the threshold, the processing is advanced to Step S1114 and, when it is determined that the amount of change of the height H is equal to or smaller than the threshold, the processing is advanced to Step S1119. Note that the threshold may be zero or may be larger than zero. The threshold may be or may not be a value determined in advance by a manufacturer or the like. For example, the threshold may also be a value (changeable value) specified by the user.

The processing steps in Steps S1114 to S1122 are the same as the processing steps in Steps S608 to S616 in FIG. 6.

As described above, according to the present embodiment, when it is determined that the posture of the user has changed, it is highly possible that the user intends to perform the display position changing operation again, and consequently the movement amount information L2 ($\Theta 2$, $\Phi 2$) is reset as appropriate. This can improve convenience.

Note that each of the various control operations described above and assumed to be performed by the CPU 101 may also be performed by one hardware item or, alternatively, a plurality of hardware items (e.g., a plurality of processors or circuits) may share processing to control the entire device.

While the present invention has been described in detail based on the preferred embodiments thereof, the present invention is not limited to these specified embodiments, and includes various forms within a scope not departing from the gist of the invention. In addition, each of the embodiments described above only shows an embodiment of the present invention, and it is also possible to combine the individual embodiments as appropriate.

According to the present disclosure, a position of a display range can easily be changed to an intended position.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited by the embodiments described above, and can variously be changed and modified without departing from the spirit and scope of the present invention. Therefore, the following claims are appended to publicize the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device comprising:
   one or more memories storing computer-executable instructions; and
   one or more processors configured to execute the computer-executable instructions to cause the electronic device to:
   detect an inclination of a display surface;
   receive a user operation; and
   perform control to display, as a display range, a portion of an image on the display surface, change a position of the display range in response to a change in the inclination of the display surface, and change the position of the display range in response to a user operation,
   wherein a second movement amount in which the display range moves in response to the change in the inclination of the display surface is corrected based on a first movement amount in which the display range is moved by the user operation, and
   wherein, in a case where the display surface is oriented in a specified direction, the display range which corresponds to the inclination of the display surface and in which the first movement amount is not reflected is determined.

2. The electronic device according to claim 1, wherein the specified direction is a horizontal direction.

3. The electronic device according to claim 1, wherein, in a state where the display surface is oriented in the specified direction, the position of the display range is not changed in response to the user operation.

4. The electronic device according to claim 1, wherein the display range is determined such that, in response to the change in the inclination of the display surface that brings a direction, in which the display surface is oriented, closer to the specified direction, the display range continuously moves to a position corresponding to the inclination of the display surface.

5. The electronic device according to claim 1, wherein
the first movement amount is a movement amount in a vertical direction, and
the second movement amount is a movement amount in which the display range moves in the vertical direction in response to the change in the inclination of the display surface in an elevation angle direction.

6. The electronic device according to claim 1, wherein, in a case where the inclination of the display surface changes, one of processing of moving the display range in the second movement amount and processing of resetting the first movement amount and determining the display range is selectively performed.

7. The electronic device according to claim 6, wherein the case where the inclination of the display surface changes is a case where the inclination of the display surface changes in a change amount larger than a threshold.

8. The electronic device according to claim 6, wherein, in the case where the inclination of the display surface changes, control is performed to display, on the display surface, a confirmation screen as to whether or not the first movement amount is to be reset.

9. The electronic device according to claim 1, wherein
the one or more processors are configured to execute the computer-executable instructions to further cause the electronic device to:
detect a posture of a user, and
in a case where the posture of the user changes, one of processing of moving the display range in the second movement amount and processing of resetting the first movement amount and determining the display range is selectively performed.

10. The electronic device according to claim 9, wherein a height at which the electronic device is located is detected as a parameter corresponding to the posture of the user.

11. The electronic device according to claim 9, wherein the case where the posture of the user changes is a case where the posture of the user changes in a change amount larger than a threshold.

12. The electronic device according to claim 9, wherein, in the case where the posture of the user changes, control is performed to display, on the display surface, a confirmation screen as to whether or not the first movement amount is to be reset.

13. The electronic device according to claim 1, wherein the image is a VR (Virtual Reality) image.

14. A method for controlling an electronic device, comprising:
detecting an inclination of a display surface;
receiving a user operation; and
performing control to display, as a display range, a portion of an image on the display surface, change a position of the display range in response to a change in the inclination of the display surface, and change the position of the display range in response to a user operation,
wherein a second movement amount in which the display range moves in response to the change in the inclination of the display surface is corrected based on a first movement amount in which the display range is moved by the user operation, and
wherein, in a case where the display surface is oriented in a specified direction, the display range which corresponds to the inclination of the display surface and in which the first movement amount is not reflected is determined.

15. A non-transitory computer readable storage medium that stores a program, wherein
the program causes a computer to execute a method for controlling an electronic device, the method comprising:
detecting an inclination of a display surface;
receiving a user operation; and
performing control to display, as a display range, a portion of an image on the display surface, change a position of the display range in response to a change in the inclination of the display surface, and change the position of the display range in response to a user operation, and
wherein a second movement amount in which the display range moves in response to the change in the inclination of the display surface is corrected based on a first movement amount in which the display range is moved by the user operation, and
wherein, in a case where the display surface is oriented in a specified direction, the display range which corresponds to the inclination of the display surface and in which the first movement amount is not reflected is determined.

\* \* \* \* \*